(12) United States Patent
Jain

(10) Patent No.: US 8,842,170 B2
(45) Date of Patent: Sep. 23, 2014

(54) METHOD AND APPARAUS FOR MAKING INTELLIGENT USE OF ACTIVE SPACE IN FRAME PACKING FORMAT

(75) Inventor: Sunil K. Jain, Portland, OR (US)

(73) Assignee: Intel Corporation, Santa Clara, CA (US)

(\*) Notice: Subject to any disclaimer, the term of this patent is extended or adjusted under 35 U.S.C. 154(b) by 805 days.

(21) Appl. No.: 12/827,461

(22) Filed: Jun. 30, 2010

(65) Prior Publication Data

US 2011/0292170 A1 Dec. 1, 2011

Related U.S. Application Data

(60) Provisional application No. 61/350,297, filed on Jun. 1, 2010.

(51) Int. Cl.
*H04N 13/04* (2006.01)
*G09G 5/00* (2006.01)
*G09G 3/00* (2006.01)

(52) U.S. Cl.
CPC ....... *H04N 13/0438* (2013.01); *H04N 13/0497* (2013.01); *G09G 5/005* (2013.01); *H04N 2213/008* (2013.01); *G09G 2370/12* (2013.01); *G09G 2370/042* (2013.01); *G09G 3/003* (2013.01); *G09G 2370/10* (2013.01); *G09G 2370/22* (2013.01); *G09G 2370/047* (2013.01)
USPC .................... 348/56; 348/42; 348/43; 348/51

(58) Field of Classification Search
CPC ............ H04N 13/007; H04N 13/0066; H04N 13/0048; H04N 13/0438; H04N 13/0497; H04N 2213/005; H04N 2213/008; G09G 3/003; G09G 5/005; G09G 2370/22; G06T 15/00
USPC .......... 348/43, 42, 46, 51, 54, 55, 56; 349/15, 349/117
See application file for complete search history.

(56) References Cited

U.S. PATENT DOCUMENTS 8,334,896 B2 \* 12/2012 Park et al. ........................ 348/51
8,427,525 B2 \* 4/2013 Funabiki et al. ................ 348/43
(Continued)

FOREIGN PATENT DOCUMENTS

JP 0-8307903 A 11/1996
JP 2005-123729 A 5/2005
(Continued)

OTHER PUBLICATIONS

CEA Standard A DTV Profile for Uncompressed High Speed Digital Interfaces CEA-861-D Jul. 2006, Published by © Consumer Electronics Association 2006 Technology & Standards Department; 2500 Wilson Boulevard copyrighted material Arlington, VA 22201.\*

(Continued)

*Primary Examiner* — Sath V Perungavoor
*Assistant Examiner* — Nathanel Aynalem
(74) *Attorney, Agent, or Firm* — International IP Law Group, PLLC

(57) ABSTRACT

Active Space separates the Left Frame from the Right Frame in a frame packing format. A source device is expected to transmit a constant pixel value. A sink device is expected to ignore all data received during the Active space regardless of the value. Embodiments of the present invention involve the Source device to embed intelligent information in the Active Space in lieu of the recommended fixed pixel value. Then the Sink device may read the embedded information from the Active Space, and infer the transition between the left frame and the right frame which is useful, for example, to synchronize eyewear.

10 Claims, 4 Drawing Sheets

(56) References Cited

U.S. PATENT DOCUMENTS

| | | | |
|---|---|---|---|
| 2002/0025075 A1 | 2/2002 | Jeong et al. | |
| 2007/0110226 A1* | 5/2007 | Ogata | 380/28 |
| 2007/0247477 A1* | 10/2007 | Lowry et al. | 345/629 |
| 2008/0266386 A1* | 10/2008 | Maeda | 348/47 |
| 2008/0309660 A1* | 12/2008 | Bertolami et al. | 345/419 |
| 2009/0073559 A1* | 3/2009 | Woodgate et al. | 359/465 |
| 2009/0086096 A1* | 4/2009 | Singh et al. | 348/478 |
| 2010/0021141 A1* | 1/2010 | Yamashita et al. | 386/109 |
| 2010/0201791 A1* | 8/2010 | Slavenburg et al. | 348/53 |
| 2011/0149032 A1* | 6/2011 | Choi et al. | 348/43 |

FOREIGN PATENT DOCUMENTS

| | | |
|---|---|---|
| JP | 2010-62695 A | 3/2010 |
| WO | 2011152940 A2 | 12/2011 |
| WO | 2011152940 A3 | 2/2012 |

OTHER PUBLICATIONS

High-Definition Multimedia Interface Specification Version 1.4a Extraction of 3D Signaling Portion, Mar. 4, 2010 Copyright ã 2001-2010 by Hitachi, Ltd., Panasonic Corporation, Philips Consumer Electronics International, B.V., Silicon Image, Inc., Sony Corporation, Technicolor, S.A., and Toshiba Corporation. All rights reserved. copyrighted mater.*

International Search Report and Written Opinion for PCT Patent Application No. PCT/US2011/034777, mailed on Dec. 26, 2011, 10 pages.

* cited by examiner

METHOD AND APPARAUS FOR MAKING INTELLIGENT USE OF ACTIVE SPACE IN FRAME PACKING FORMAT

CROSS-REFERENCE TO RELATED APPLICATIONS

This application claims priority to U.S. Provisional Application Ser. No. 61/350,297, filed on Jun. 1, 2010, the contents of which are herein incorporated by reference.

FIELD OF THE INVENTION

Embodiments of the present invention are directed to stereoscopic systems and, more particularly, to eyewear systems useful for three-dimensional (3D) viewing.

BACKGROUND INFORMATION

Humans have what is known as binocular vision owing to the fact that we have two eyes separated by a couple of inches. Each eye views the same scene from a slightly different perspective view each providing the brain with slightly different information. These two views are combined by the brain such that we perceive depth and see the world in three-dimensions (3D).

Electronically stored or transmitted visual images, such as pictures or video, is typically displayed on a two dimensional medium such as a television screen or other type of monitor or projected on to a screen. Both eyes view the same information. The brain is thus left to use other visual cues from the two-dimensional (2D) image, such as relative sizes of objects, shadow, perspective lines, or horizons, to name a few, to sense depth. However, the picture still looks flat and not like we see the real world.

Stereoscopy refers to any of various processes and devices for giving the illusion of depth from two-dimensional images. We say illusion because true 3D may be more like a hologram where you could walk around the image and change your perspective. However, when done correctly, stereoscopy can trick the brain into thinking objects are jumping out of the screen at you.

In its simplest form, two cameras, or one camera with two lenses, spaced a few inches apart, are used to capture two 2D images. Each 2D image, of course, is from a slightly different perspective such that when the left eye views one image and the right eye views the other, the brain combines the views and we see the combined image as three-dimensional (3D).

Big screen stereoscopic motion pictures or "3D movies", as is the term more commonly used, are becoming quite popular again. In addition, 3D technologies are now available for home video with the so-called 3D TVs, video games, and streaming and recorded video content for computer monitor viewing.

There are several types of stereoscopic or "3D" technology available. Most require the viewer to wear special glasses or goggles. Some require active components in the glasses, others do not. Some require special monitors or drivers. Each has it pros and cons and, depending on the situation, may or may not make sense for a specific task.

Regardless of the technology used, the end goal is primarily to separate what the left and the right eye sees. Early technologies involved physical separation where a viewer looked into a binocular-like device, with a lens for each eye to physically separate the left and right views. This technique which may be the oldest, works quite well and a close variation of this technique is still used in modern virtual reality goggles or head-mounted displays. However, this is only good for one person or individual viewing and may be expensive or impractical for more than a couple viewers.

One of the first left/right (L/R) separation technologies good for the masses was spectral separation. The technical term is "color anaglyph" and involved each viewer wearing a pair of glasses with a red filter for one eye and a blue filter for the other. The left and right images were likewise blue or red encoded and displayed simultaneously. This technique was popular for producing 3D movies in the 1950s and even works to some degree with standard color televisions or monitors. While providing a novelty for its day, it left much to be desired aesthetically. The end result tended to be monochromatic, and had a lot of ghosting (i.e. the L/R separation was not clean). On the pro side, it was inexpensive to produce and the glasses were passive and very inexpensive.

Similar to spectral separation, the next most common technique is spatial separation and involves the viewers wearing polarized glasses, with each eye lens being polarized at 45 degrees, for example, to the other or circularly polarized in opposite directions. This is the technology used most often today in movie theaters. It works pretty well with the L/R separation being fairly complete, but usually requires two projectors or a special projector in a theatre setting or a few additional layers in a monitor which adds cost. Also, each eye only sees half resolution which may degrade the viewing experience. On the pro side, the polarized glasses are again passive and therefore relatively inexpensive.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As discussed above, both spectral separation and spatial separation techniques use passive glasses having various filter technologies to separate the left and right eye images. Temporal separation involves active glasses technology. Active glasses may be glasses that alternately black out the left and right eyes as the display alternately displays the left and right images.

For example, active glasses may be called shutter glasses or shutter goggles and may have liquid crystal displays (LCDs) in each eye that are caused to turn black every other frame to block, say the left eye, from seeing the right image and vice-versa for the next frame. These work well, but you get half the frames in one eye, and half the frames in the other. This can lead to headaches as your eyes try to compensate for the on/off light, low frame rates for gamers and synch problems between the display and the glasses.

Figure 1:
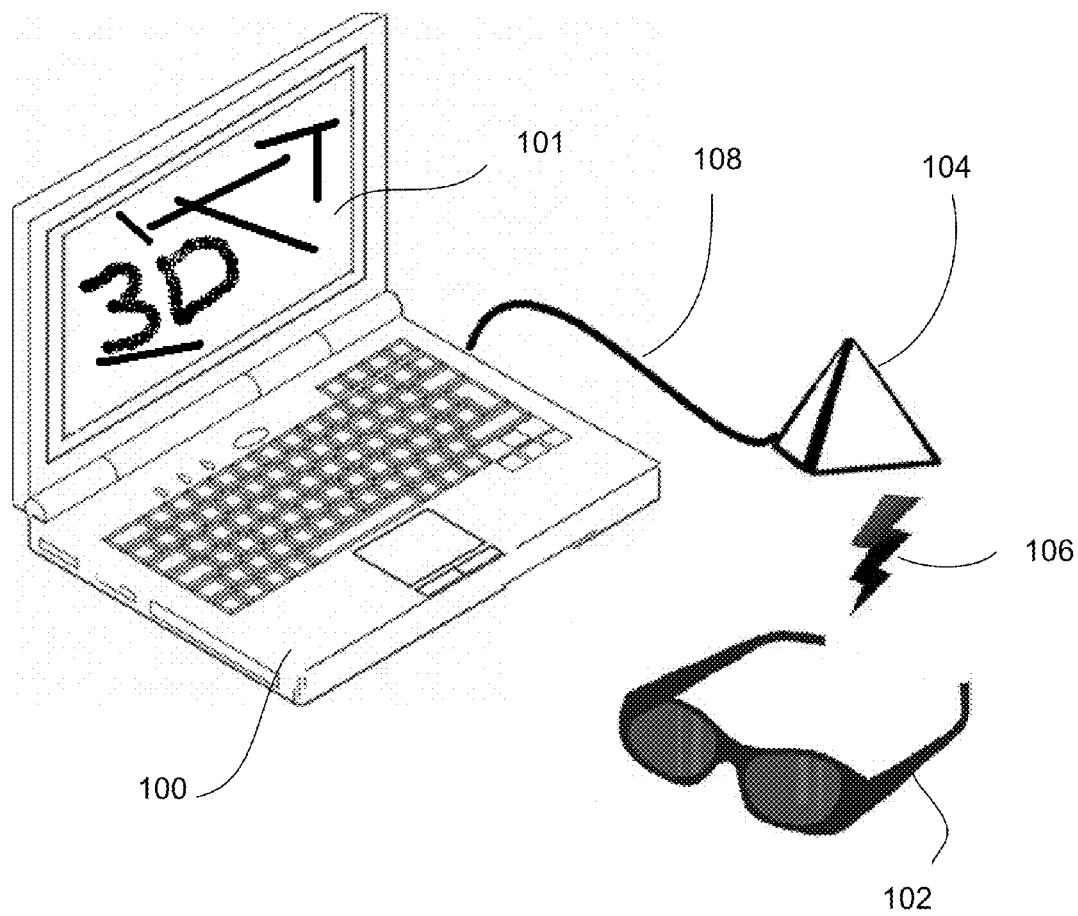
FIG. 1 is a platform, such as a laptop or other device for viewing 3D video.

FIG. 1 illustrates one system for 3D viewing using active glasses. As shown a computer 100 or other monitor has a display screen 101 for displaying 3D video content using temporal separation. The video content source may be recorded such as on CD or stored in a memory, streamed over a network, such as the internet, over the air or cable broadcasts, or any other suitable video delivery method.

Active glasses 102 typically use a transmitter 104 that is synced to the frame rate of the display 101. This transmitter 104 may use a number of wireless 106 technologies to communicate with the eyewear or glasses 102, such as infra red (IR), Radio frequency (RF), Bluethooth, etc. The transmitter 104 may be tethered to the computer 100 by a cable 108, such as a universal serial bus (USB) or USB2 cable.

In stereoscopic systems, it is desirable that eyewear shuttering be tightly coupled to the time when image is stable on the display 101. Video Electronics Standards Association (VESA) standard timings may not allow sufficient stable image time if the image is changing at each frame.

Prior solutions help a bit by allowing for the extended vertical blank timing. This may improve the image stability to a maximum period of about 32%. Further, due to small duty cycle, average perceived brightness on the display viewed through active shutter glasses is pretty low. For smaller screen size devices such as note books or netbooks, the problem of 3D viewing quality gets exacerbated.

Figure 2:
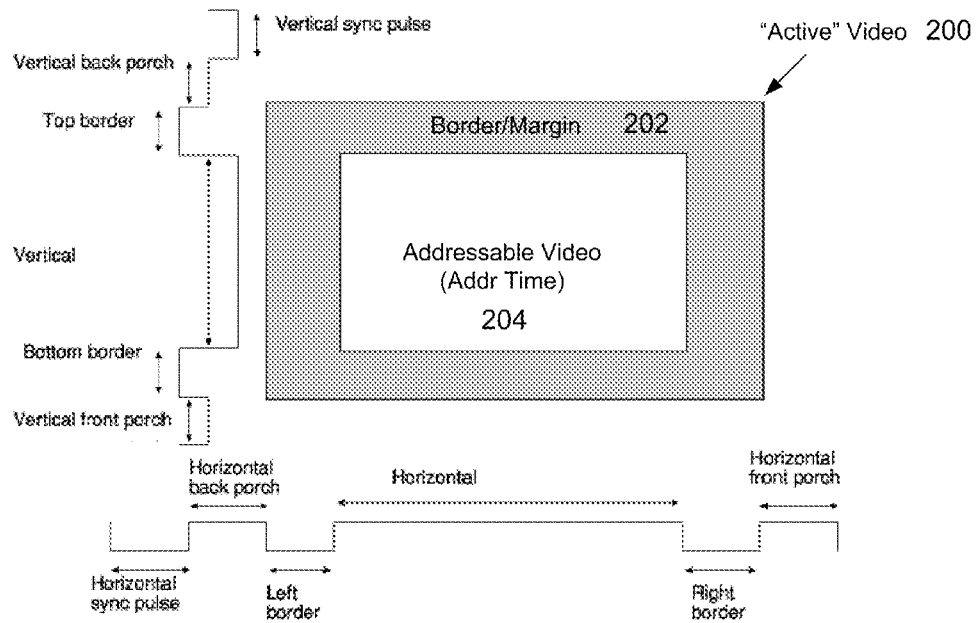
FIG. 2 is a timing diagram showing the vertical and horizontal timing parameters plotted along their respective axis along an illustration of an active video display area.
Figure 3:
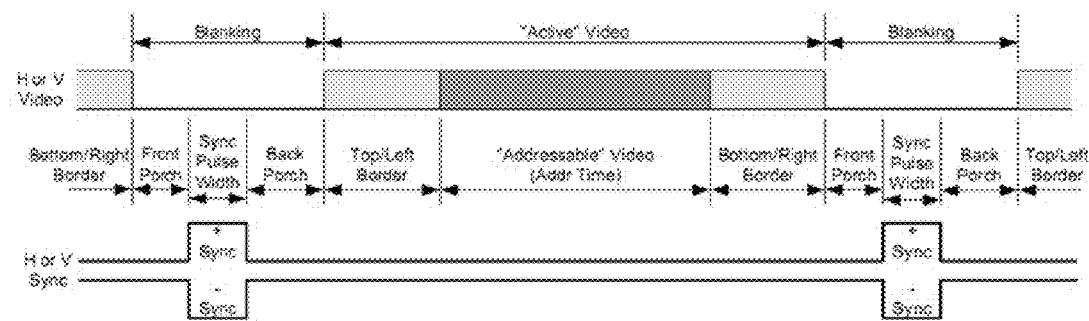
FIG. 3 is a timing diagram showing the video timing parameters, similar to FIG. 2, plotted along the same time axis.

FIGS. 2 and 3 both illustrate video timing parameters. FIG. 2 shows the active video are 200 comprising a border or margin 202 and addressable video area (Addr Time) 204 with the vertical timing parameters fashioned along the vertical axis if the active video 200 and the horizontal timing parameters fashioned along the horizontal axis of the active video 200 for ease of illustration. FIG. 3 is similar to FIG. 2 but that it shows essentially the vertical and horizontal video timing parameter along the same axis as they may occur in real time.

The video timing parameters of either FIG. 2 or FIG. 3 may be defined as follows:

Horizontal Addressable Video is the time between the end of the Left Border and the beginning of the Right Border.

Horizontal Blanking is the time between the end of the Right Border and the beginning of the Left.

A Border includes the Horizontal Front Porch time, the Horizontal Sync Pulse Width time and the Horizontal Back Porch time.

Horizontal Front Porch is the time between the end of the Right Border and the beginning of the Horizontal Sync Pulse.

Horizontal Left Border is the time between the end of the Horizontal Blanking period and the beginning of the Horizontal Addressable Video region.

Horizontal Right Border is the time between the end of the Horizontal Addressable Video region and the beginning of the Horizontal Blanking period.

Horizontal Sync Pulse Width is the time between the end of the Horizontal Front Porch and the beginning of the Horizontal Back Porch.

Horizontal Back Porch is the time between the end of the Horizontal Sync Pulse and the beginning of the Left Border.

Horizontal Active Video is the sum of the Horizontal Left Border time, the Horizontal Addressable Video time and the Horizontal Right Border time.

Vertical Addressable Video is the time between the end of the Top Border and the beginning of the Bottom Border.

Vertical Blanking is the time between the end of the Bottom Border and the beginning of the Top Border and may include the Vertical Front Porch time, the Vertical Sync Pulse Width time and the Vertical Back Porch time.

Vertical Front Porch is the time between the end of the Bottom Border and the beginning of the Vertical Sync Pulse.

Vertical Top Border is the time between the end of the Vertical Blanking period and the beginning of the Vertical Addressable Video region.

Vertical Bottom Border is the time between the end of the Vertical Addressable Video region and the beginning of the Vertical Blanking period.

Vertical Sync Pulse Width is the time between the end of the Vertical Front Porch and the beginning of the Vertical Back Porch.

Vertical Back Porch is the time between the end of the Vertical Sync Pulse and the beginning of the Top Border.

Vertical Active Video is the sum of the Vertical Top Border time, the Vertical Addressable Video time and the Vertical Bottom Border time.

Figure 4:
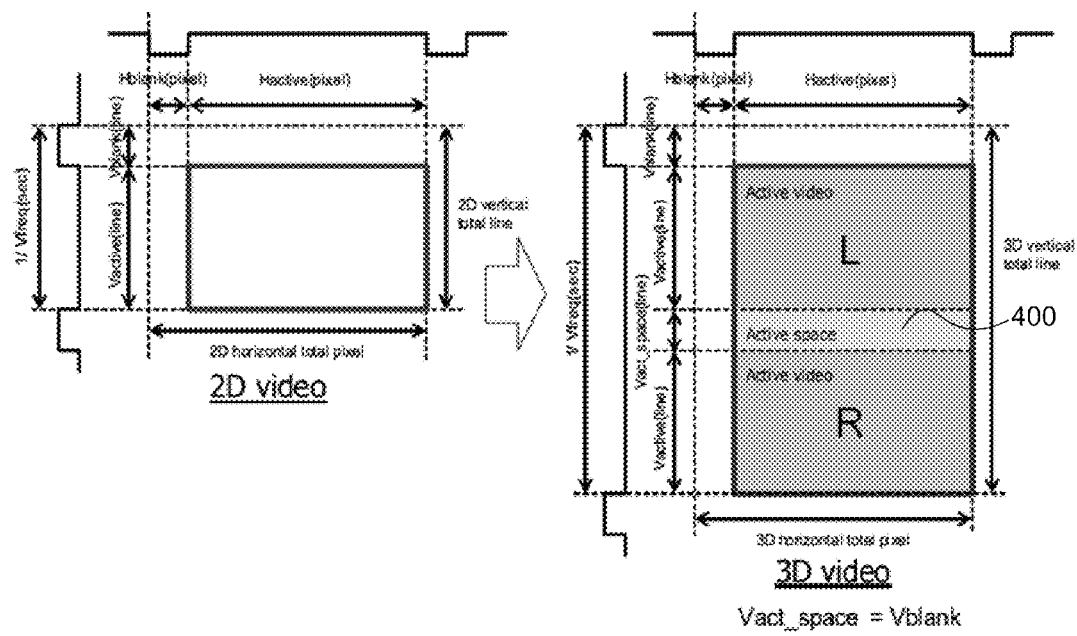
FIG. 4 are High Definition Multimedia Interface (HDMI) timing diagrams illustrating 2D frames and frame stacking for 3D video.

Referring now to FIG. 4 there is shown timing diagrams comparing 2D video and 3D video frame stacking according to one High Definition Multimedia Interface (HDMI) standard. A 2D frame is shown on the left and a 3D frame is shown on the right. Note the 3D horizontal total pixel is equal the 2D horizontal total pixel. The 3D vertical total line is twice the 2D vertical total line. The 3D pixel clock frequency is twice the 2D pixel clock frequency. This structure may be applied to the progressive video format.

Obtaining accurate information about Left/Right (L/R) frame placement and frame change has been a technological challenge so far for the conventional stereoscopic-3D systems. That is why, the conventional active liquid crystal shutter based 3D Eyewear (as shown, for example in FIG. 1) typically provides a switch on the glasses 102 that manually flips between left and right frame synchronization to avoid ghosting. It would be desirable to eliminate this switch and provide this function automatically. Embodiments of this invention solves this problem and provides a low cost mechanism not only to provide this function, but also provide more information that can be useful for many other purposes.

As shown in FIG. 4, by definition the HDMI Active Space 400 separates the Left Frame from the Right Frame. Per standard specifications, during the Active space 400, an HDMI source (e.g. a PC or other viewing device) is expected to transmit a constant pixel value. HDMI sink (e.g. the active shutter glasses) is expected to ignore all data received during the Active space 400 regardless of the value. Embodiments of the present invention involve the Source device to embed intelligent information in the Active Space in lieu of the recommended fixed pixel value. Then on the Sink side, this invention causes the Sink device to read the embedded information from the Active Space, and infer to cause further useful actions, such as synching of eyewear of panel optics, etc.

Typically Active Space 400 is one or more vertical lines with large number of horizontal pixels depending upon the frame resolution, plenty of useful information such as unique device id, temporal and spatial stamps, etc. may be embedded in these packets, opening a plethora of applications in multi-transmitter-multi-viewer scenarios that are not possible for enjoying personal 3D today (e.g. multiple 3D laptop users in a room with individual glasses looking at their own screen, projector and their neighbor's screen).

Because the placement of Active Space 400 is fixed by the HDMI spec (in between the left and the right frames), intelligence embedded in the Active Space implicitly also conveys position of the left and right frame deterministically (even though that is not the original intent of the Spec). Thus this innovation presents a very powerful infrastructure for creating high quality Stereoscopic-3D systems with and without eyewear.

In one implementation, high quality Stereoscopic 3D eyewear is possible that is not only synched to the frame timing but also to left/right placement.

In another embodiment it is possible to aid the optical elements of autosterescopic displays (without needing special eyewear) to synch with left/right frame info or the info about multiple views that can also be embedded in the active space.

In yet another embodiment, it is possible to transmit a predetermined custom pixel color that can be decoded by the eyewear directly.

With this invention, deterministic left/right frame placement information can be provided in a novel in-band method, that substitutes USB peripheral with a low cost embedded emitter, eliminates the switch on the eyewear, and makes multi-transmitter-multi-viewer with eyewear scenario possible. The invention puts the Active Space 400 mandated by the HDMI spec to a useful purpose, that was otherwise being ignored as the spec suggests. Compliance to the spec doesn't break because this information is picked, such as by a garbage collector, and recycled for useful purpose.

In yet another embodiment, stereoscopic content playback generally involves special players that combine the two video streams into a desired output 3D format. Many such players may become available in the market as stereoscopic playback catches market interest. However because these players are special, these add extra cost to the 3D PC, and perhaps more importantly these limit the choices of end user to enjoy 3D content to specific hardware with specific software. Validation and compliance of many such commercial solutions is yet another costly vector. According to one embodiment, this invention may enable almost any conventional 2D media player 3D playback capable on a mainstream PC.

Figure 5:
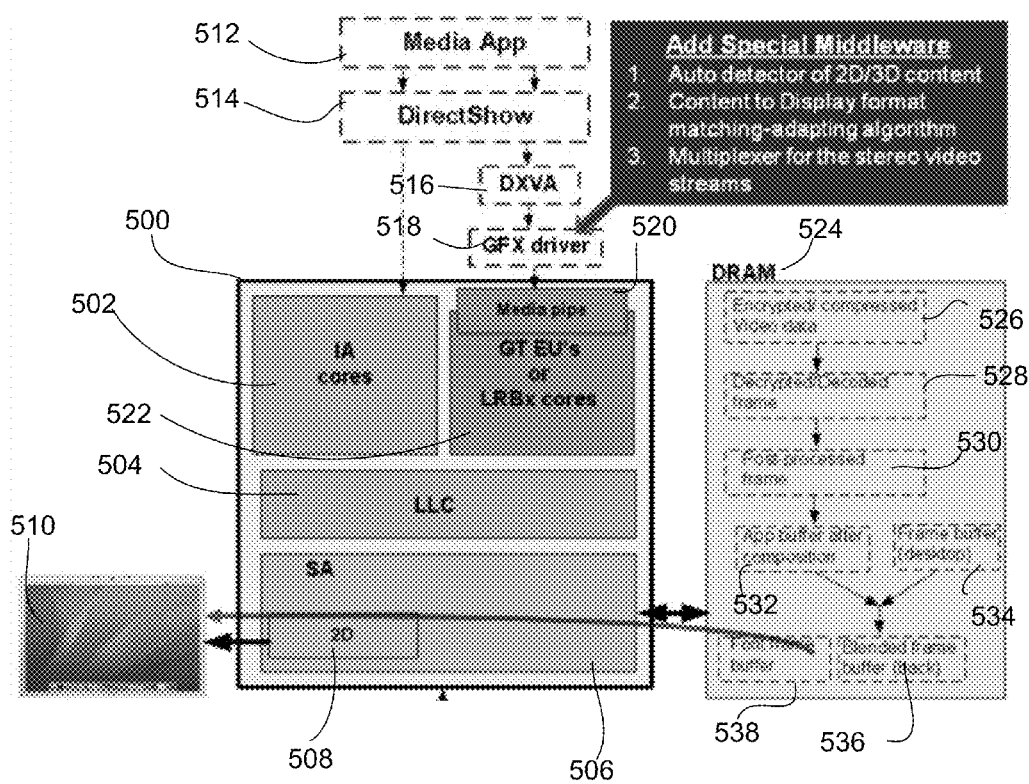
FIG. 5 is a block diagram showing features added to a graphics driver to discover if content is 2D or 3D and apply content to display format matching for best viewing quality.

FIG. 5 shows a block diagram according to one embodiment. Embodiments may include a PC comprising CPU cores 502 and LLC 504 and SA 506 and a 2D 508 connected to a display 210. A Media App 512 may be connected to a DirectShow codec 514 which may feed into a DXVA 516 and a GFX driver 518. The GFX driver may connect to a media pipe 520 which may include a GT EU or LRBx Cores 522. A DRAM 524 may communicate with the PC 500. A process with may be stored in the DRAM 524 may include Encrypted/compressed video data in block 526 which is decrypted and decoded to a frame in block 528. There after the frame may be processed into a post processed frame in block 530 and then a App buffer after composition at clock 532. Block 532 and a frame buffer (desktop) 534 may be combined into a blended frame buffer at block 536. A font frame buffer 538 may also be included.

An embodiment may be realized as middleware that can be most effective if implemented as an extension to the graphics driver 518 (however stand-alone middleware application is also possible). The GFX driver 518 may be modified to 1) Auto detector of 2D/3D content 2) Content to Display format matching-adapting algorithm 3) Multiplexer for the stereo video streams.

In short, embodiments automatically discover if the content if content to be displayed 2D or 3D. Detection may be simple, for example, a typical windows media player on mainstream PC will open two independent windows if stereo content is played back. Then the PC system configuration and content formats being played back are discovered. Typical Gfx driver has this information from display EDID and media player parameters. Then via a video stream combiner that is implemented as an extension of the Gfx driver, apply content-to-display format matching algorithms and adapt the content for best viewing quality for the user. This method can be applied to most general purpose media players in mainstream PC.

By definition, since high level media player applications are typically designed to be hardware agnostic, these are not optimized to specific hardware. In contrast, embodiments of this invention are designed to reside in the graphics driver instead, and thus make use of the hardware level information available to the driver. Being middleware this invention is unique to take advantage of best of both sides: codec issues are handled by high level media player while display format and quality issues are handled by the driver and its hardware underneath. The middleware thus makes a typical 2D media player behave as a high quality stereo video player rendering to 3D display.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
providing a video stream having a left active video frame and a right active video frame separated by an active space;
providing data in the active space, wherein the data comprises unique device identification data; and
inferring a position of the left active video frame and a position of the right active video frame by reading the data in the active space, wherein the positions are inferred with and without the use of eyewear.

2. The method as recited in claim 1 wherein the video stream comprises a high definition multimedia interface (HDMI) signal.

3. The method as recited in claim 2 where the data in the active space comprises a temporal stamp.

4. The method as recited in claim 2 wherein the data in the active space comprises a spatial stamp.

5. A system comprising:
   a source device to provide a video stream having a left active video frame and a right active video frame separated by an active space, wherein the source device provides embedded data in the active space, wherein the embedded data comprises unique device identification data; and
   active shutter glasses to receive the video stream and read the embedded data in the active space, wherein the active shutter glasses infer a position of the left active video frame and a position of the right active video frame from the position of the embedded data, wherein the positions are inferred with and without the use of eyewear.

6. The system as recited in claim 5, wherein the source device is a high definition multimedia interface (HDMI) device and then active shutter glasses are a HDMI device.

7. The system as recited in claim 6 wherein the source device comprises a computer with a display.

8. The system as recited in claim 5, wherein the active shutter glasses synchronize to the display using the inferred position of the left active video frame and the inferred position of the right active video frame from the position of the embedded data.

9. The system as recited in claim 5, where the embedded data in the active space comprises a temporal stamp.

10. The system as recited in claim 5, wherein the embedded data in the active space comprises a spatial stamp.

* * * * *